Patented Dec. 13, 1927.

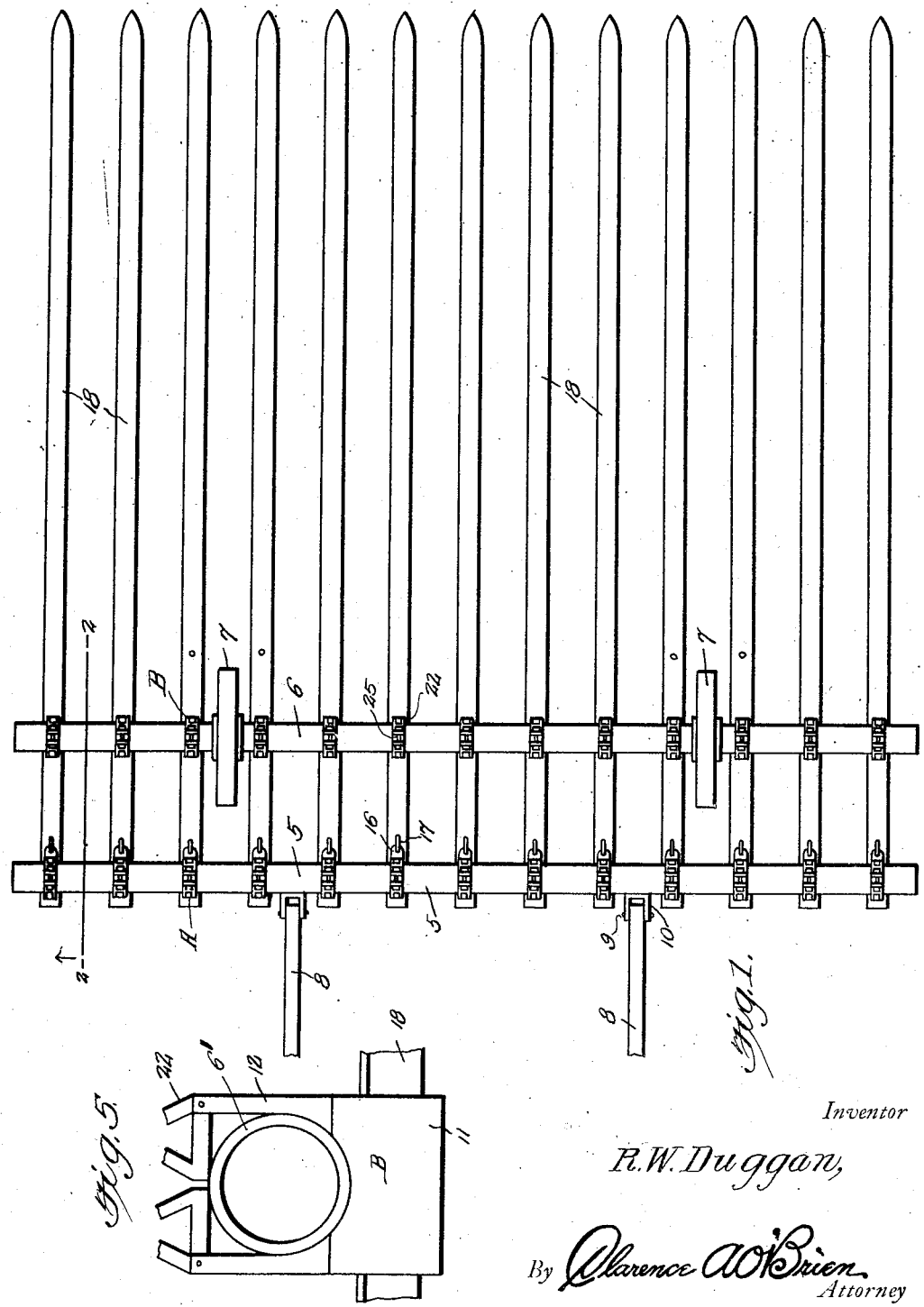

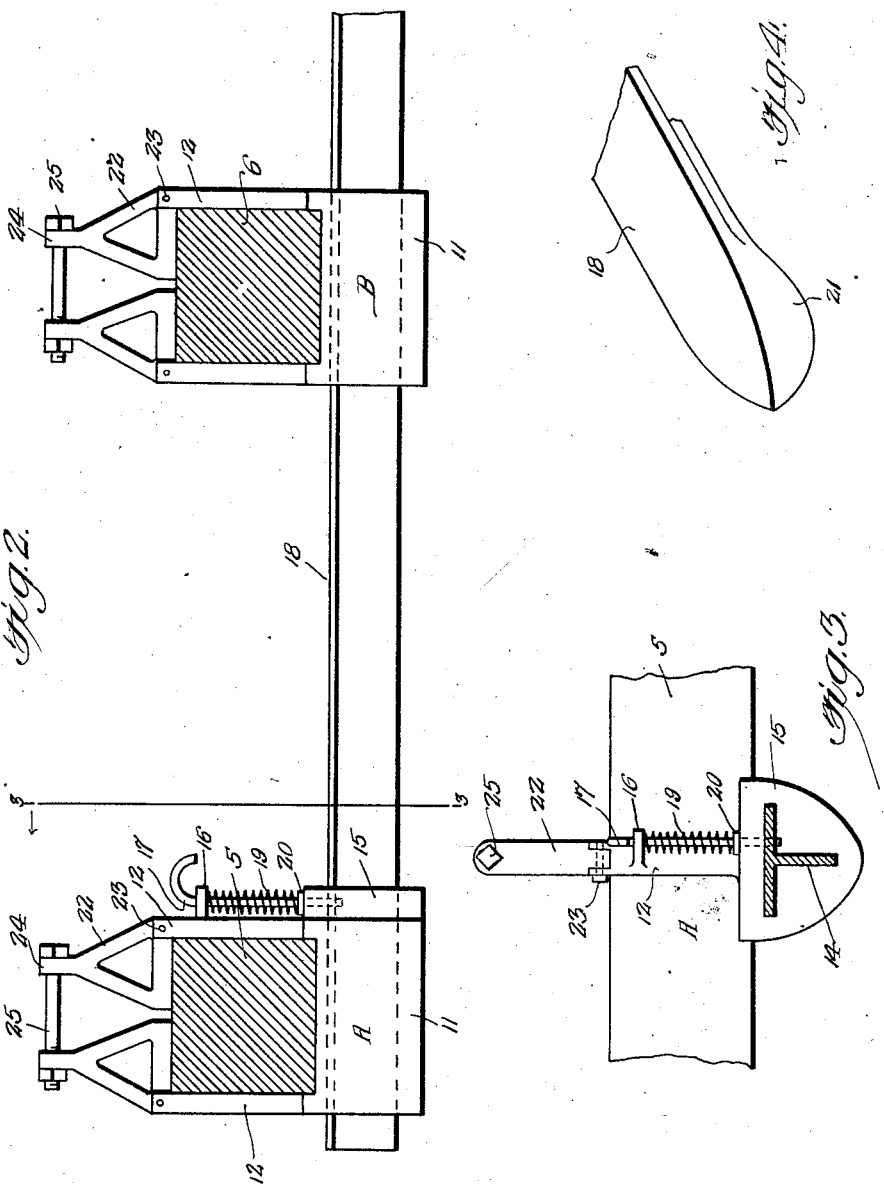

1,652,350

UNITED STATES PATENT OFFICE.

RICHARD W. DUGGAN, OF DICKENS, NEBRASKA.

HAY SWEEP.

Application filed December 28, 1926. Serial No. 157,518.

The present invention relates to a hay sweep and has for its general object to provide an all metal device of this nature which will prove strong and durable, efficient and reliable in use, and a structure that may be manufactured at a comparatively low cost and is capable of easy assembly.

Another very important object of the invention lies in the provision of a structure of this nature which includes a pair of transverse parallel spaced supporting members with means thereon for supporting a plurality of longitudinally extending spaced parallel teeth in a detachable manner.

With the above and numerous other objects in view as will appear as the description proceeds, the invention resides in certain novel features of construction, and in the combination and arrangement of parts as will be hereinafter more fully described and claimed.

In the drawing:

Figure 1 is a top plan view of the hay sweep embodying the features of my invention, Fig. 2 is an enlarged detail longitudinal section taken substantially on the line 2—2 of Fig. 1, Fig. 3 is an enlarged detail transverse section through the sweep taken substantially on the line 3—3 of Fig. 2, Fig. 4 is a detail perspective view showing the forward end of one of the teeth, Fig. 5 is an enlarged fragmentary elevation showing a modification of one of the cross supports.

Referring to the drawing in detail it will be seen that the numerals 5 and 6 denote cross supports which are disposed in spaced parallelism. The cross support 6 has wheels 7 journaled thereon in any suitable or preferred manner., These wheels 7 are preferably disposed equidistant from each end thereof. Numerals 8 denote draft tongues or rods which are pivotally engaged at their forward ends as at 9 in brackets 10 mounted on the rear cross support 5. These tongues or rods 8 may be attached to draft means such as a tractor or any other suitable means in any preferred manner so that the sweep may be pushed ahead of the draft means used.

A plurality of castings A and B are mounted respectively on cross supports 5 and 6. Each casting A, B is U-shaped in formation to include a bight 11 disposed under the cross support 5, 6 and a pair of upstanding legs 12, the upper extremities of which are bifurcated as is illustrated in Figure 3. The bights 11 are provided with longitudinally extending T-shaped openings 14. The bights 11 of the casings A are provided with forward extensions 15 and the forward legs 12 are provided with horizontal ears 16. A bolt 17 is slidable through the ears 16 and an opening in the top of the corresponding extension 15. Teeth 18 extend through the openings 14 and the bolts 17 engage in openings therein being held normally engaged by springs 19 impinging against the shoulders 20 and ears 16. The teeth 18 are T-shaped in cross section as is illustrated in Figure 3 but the forward ends thereof are tapered to form noses 21 as is illustrated to advantage in Fig. 4. Members 22 are formed in the shape of an isosceles triangle but have corners pivoted as at 23 in the bifurcated extremities of the legs 12 and other corners thereof are provided with ears 24 through which pass bolts 25. Thus two of the members 22 are associated with each casting A, B, and the bolt 25 may be adjusted for swinging these members 22 so as to clamp the castings A, B, upon the cross support 5, 6. In Figure 5 it will be seen that the cross supports may be circular if so desired as is indicated at 6'.

It is thought that the construction, utility and advantages of this device will now be apparent to those skilled in this art without a more detailed description thereof. The present embodiment of the invention has been disclosed in detail merely by way of example since in actual practice it attains the features of advantage enumerated as desirable in the statement of the invention and the above description. It is apparent that changes in the details of construction, and in the combination and arrangement of parts may be resorted to without departing from the spirit or scope of the invention as hereinafter claimed or sacrificing any of its advantages.

Having thus described my invention what I claim as new is:

1. A hay sweep comprising a pair of cross supports disposed in spaced parallel relation, a plurality of U-shaped members having their bight portions positioned under the supports and their legs rising upwardly, means engaged with the extremities of said legs to clamp the members on the supports, said bight portions having longitudinally extending openings, teeth extending through the openings in spaced parallelism, and means on some of the members for engaging the teeth to lock them against longitudinal movement in the openings.

2. A hay sweep comprising a pair of cross supports disposed in spaced parallelism, a plurality of U-shaped members having their bight portions positioned under the supports and their legs rising upwardly, pivoted members on the upper extremities of the legs, bolts engaging said pivoted members to clamp the U-shaped members on the supports, said bight portions having longitudinally extending openings, teeth extending through the openings in spaced parallelism with each other, and means on some of the U-shaped members for engaging the teeth to lock them against longitudinal movement.

3. A hay sweep comprising a pair of cross supports disposed in spaced parallel relation, a plurality of U-shaped members having their bight portions positioned under these supports and their legs rising upwardly, triangular members having corners pivoted on the upper extremities of the legs, ears projecting from other corners of the triangular members, bolts passing through the ears so that the U-shaped members may be clamped on the supports, said bight portions being provided with longitudinally extending openings, teeth extending through the openings in spaced parallelism and means on some of the members for engaging the teeth to lock them against longitudinal movement.

In testimony whereof I affix my signature.

RICHARD W. DUGGAN.